United States Patent [19]
Leach et al.

[11] 4,113,509
[45] Sep. 12, 1978

[54] ENZYMATICALLY PRODUCED MALTOSE-MALTOTRIOSE STARCH HYDROLYSATE

[75] Inventors: Harry Woods Leach, Willow Brook; Ronald Emil Hebeda, Woodridge; Dennis John Holik, Naperville, all of Ill.

[73] Assignee: CPC International Inc., Englewood Cliffs, N.J.

[21] Appl. No.: 721,926

[22] Filed: Sep. 9, 1976

Related U.S. Application Data

[63] Continuation of Ser. No. 577,523, May 14, 1975, abandoned, which is a continuation-in-part of Ser. No. 437,452, Jan. 28, 1974, Pat. No. 3,915,618, which is a continuation-in-part of Ser. No. 349,899, Apr. 10, 1973, abandoned.

[51] Int. Cl.$^2$ .......................... C13K 1/06; C12D 13/02
[52] U.S. Cl. ..................................... 127/29; 195/31 R
[58] Field of Search .................. 127/29, 39, 36, 38; 195/29, 34, 36, 38

[56] References Cited

U.S. PATENT DOCUMENTS

| | | | |
|---|---|---|---|
| 3,535,123 | 10/1976 | Heady | 195/31 R |
| 3,791,865 | 2/1974 | Hurst et al. | 195/31 R |

OTHER PUBLICATIONS

Whelan et al., "The Mechanism of Carbohydrase Action, Part II, α-Amylolysis of Linear Substrates", *Journal of the Chemical Society,* (Apr. 1953), pp. 1298–1304.
Bird et al., "The Action of Some α-Amylases on Amylose", *Biochem. Journal,* vol. 56, (1954), pp. 86–99.
Saito, "A Thermophilic Extracellular Alpha-Amylase from Bacillus Licheniforms", *Arch. Biochem. Biophys.,* vol. 155, (1973), pp. 290–298.

*Primary Examiner*—Raymond N. Jones
*Assistant Examiner*—Thomas G. Wiseman

[57] ABSTRACT

A process for converting granular starch to a soluble hydrolysate wherein the unconverted starch retains its granular nature. The conversion is accomplished by means of a bacterial alpha-amylase.

2 Claims, No Drawings

ENZYMATICALLY PRODUCED MALTOSE-MALTOTRIOSE STARCH HYDROLYSATE

CROSS REFERENCE TO RELATED APPLICATIONS

This application is a continuation of application Ser. No. 577,523 filed May 14, 1975, now abandoned which is a continuation-in-part of U.S. application Ser. No. 437,452, filed Jan. 28, 1974, now U.S. Pat. No. 3,915,618 which in turn is a continuation-in-part of U.S. application Ser. No. 349,899, filed Apr. 10, 1973 now abandoned.

The invention of this application relates to the solubilization of granular starch by enzymes, and more particularly to the conversion of granular starch to hydrolytic products.

BACKGROUND OF THE INVENTION

Starch is a polymeric carbohydrate material of very high molecular weight. Its monomeric units, termed anhydroglucose units, are derived from dextrose, and the complete hydrolysis of starch yields dextrose. In the United States, dextrose is manufactured from corn starch; in Europe from corn starch and potato starch; and in Japan from corn starch and white sweet potato starch.

Until 1960, dextrose was prepared from starch by acid hydrolysis. The method of preparation involved heating starch with hydrochloric or sulfuric acid at temperatures of 120°–145° C, then neutralizing the hydrolysis mixture with sodium carbonate, clarifying, and crystallizing the dextrose. Unfortunately, the yield of dextrose is lowered by the formation of relatively large amounts of reversion products, i.e., products which are formed by the recombination of dextrose molecules. Also, because of the high temperature and low pH of the hydrolysis reaction, some of the starch is converted to hydroxymethyl furfural, levulinic acid and color bodies. The formation of such degradation products is irreversible and, to the extent they are formed, the yield of desired dextrose is of course adversely affected. Still further, the use of hydrochloric acid or in some instances, sulfuric acid, and the subsequent neutralization of this acid with alkali results in the formation of inorganic salts which interfere with crystallization of the final dextrose product.

Later, hydrolysis of starch to dextrose was accomplished by means of enzymes. The principal enzyme used for such purpose was, and continues to be, glucoamylase. This enzyme effectively hydrolyzes the starch by cleaving one molecule of dextrose at a time from the starch molecule. As a practical matter, however, it is necessary first to thin the starch before subjecting it to the action of glucoamylase. This thinning step may be accomplished either by means of acid or enzyme. The starch is thinned to a D.E. of about 10-20, then treated with glucoamylase. This two-stage process is referred to as an acid-enzyme process or an enzyme-enzyme process, depending upon the nature of the thinning step employed.

In the case of the acid-enzyme process, the initial acid-thinning step also requires a rather high temperature, i.e., in the order of 120° C. This of course produces starch fragments that readily retrograde, and also produces reversion products. As expected, these occur at the expense of the desired formation of dextrose.

The same is characteristic of the enzyme-enzyme process which also requires a relatively high temperature for the thinning step, viz., 85°–95° C. Furthermore, it is usual practice to heat the thinned starch at still higher temperatures, viz. of the order of 120°–160° C, to complete gelatinization of the starch and to improve filtration. In addition, certain fat-amylose complexes are formed which are quite insoluble and cause filtration difficulties.

None of these processes is entirely free of processing difficulties because of the inevitable presence of retrogradation products, starch-fat complexes and reversion products. To the extent that these are formed, processing difficulties are encountered particularly in the filtration of the product mixture, and the yield of dextrose is diminished.

Wallerstein et al (U.S. Pat. No. 2,583,451) disclose an enzymatic hydrolysis process which does not utilize a high temperature, gelatinization step, but the yields of dextrose are quite low. Leach et al, Cereal Chemistry, Vol. 38, No. 1 January, 1961, pp. 34–46, likewise show the enzymatic hydrolysis of granular starch, with various alpha-amylases, but at low temperatures.

OBJECTS OF THE INVENTION

It is the object of the present invention to provide a process for the solubilization of granular starch.

It is another object of the present invention to provide a process which produces novel syrups having a high quantity of disaccharides and trisaccharides.

It is another object of the present invention to provide such a process which is characterized by the substantial absence of the above processing difficulties.

It is another object of the present invention to provide such a process which is characterized also by relatively low temperatures.

It is yet another object of the present invention to provide such a process which can be carried out conveniently and economically.

SUMMARY OF THE INVENTION

These and other objects are accomplished by a process for solubilizing starch comprising mixing a granular starch with water, a bacterial alpha-amylase, and heating the mixture at a temperature between the normal initial gelatinization temperature and the actual gelatinization temperature of the starch. The pH is preferably in the range of from 5 to about 7. A saccharifying enzyme may be added with the bacterial alpha-amylase or during solubilization or after substantial solubilization of the granular starch has occurred. The saccharifying enzyme may be either glucoamylase or a maltogenic enzyme, i.e., beta amylase. The saccharifying enzyme is preferably added after the granular starch is substantially solubilized at the solubilization temperature or at a lower temperature, i.e., a temperature in the range of from about 50° to about 65° C and at a pH in the range of from about 4.0 to 6.0.

Alternatively, the objects of the invention may be accomplished by subjecting an aqueous slurry of granular starch to the action of bacterial alpha-amylase alone, i.e., in the absence of a saccharifying enzyme. That is, granular starch, water and a bacterial alpha-amylase are mixed under the above conditions, to produce a soluble starch hydrolysate.

DESCRIPTION OF THE PREFERRED EMBODIMENTS

The starch may be any of those commonly available, including corn starch, waxy maize starch, tapioca starch, potato starch, white sweet potato starch, wheat starch, sago starch, sorghum starch, high amylose starch and the like. Waxy and the non-waxy starches are suitable. As indicated, the starch is granular. Corn grits and other raw materials high in starch content may be used satisfactorily. Non-waxy corn starch is preferred.

An important advantage of the process is that it may be carried out in an aqueous slurry at relatively high concentrations. The solids content of the starch slurry is generally within the range of from about 5% to about 40% although ordinariy the solids content will be 10–30%. Lesser concentrations can of course be used, and in general as the concentration is decreased, so is the extent of starch solubilization increased, and thus the yield of dextrose is increased when using glucoamylase as the saccharifying enzyme. As a practical matter however, it is highly desirable in most instances to use smaller volumes, i.e., higher concentrations of starch. This avoids or at least diminishes the considerable expense of concentrating the conversion mixture prior to recovery such as by crystallization. In some cases, however, the advantage of the present invention may be sufficient to outweigh this disadvantage, and a concentration of about 10% solids would be preferred.

The process herein permits the solubilization of virtually all of the starch in a 25% aqueous slurry, within a period of 24 hours. Furthermore, at higher concentrations any undissolved starch can be recycled so as to improve the overall efficiency; i.e., to solubilize more than 90% of the starch.

The bacterial alpha-amylase preferably is one which is active within the pH range of from about 4.0 to about 7.0 and which possesses appreciable activity at relatively low temperatures, i.e., below the temperature at which a particular starch gelatinizes. Preferred sources of such alpha-amylases include certain species of the *Bacillus* microorganism, viz., *B. subtilis, B. licheniformis, B. coagulans* and *B. amyloliquefaciens*. Suitable alpha-amylases are described in Austrian patent application No. 4836/70 and in U.S. 3,697,378. Especially suitable amylases are those derived from *B. licheniformis* as described in the above Austrian patent application. Particularly preferred is that alpha-amylase derived from *B. licheniformis* strain NCIB 8061; other specific microorganisms include *B. licheniformis* strains NCIB 8059, ATCC 6598, ATCC 6634, ATCC 8480, ATCC 9945A and ATCC 11945. They are unusually effective in the liquefaction of granular starch, i.e. when used in the substantial absence of glucoamylase. One such enzyme is identified by the trade name "Thermamyl", available from Novo Enzyme Corporation, Mamaroneck, New York. For such use the alpha-amylase should be used in a concentration ranging from about 0.1 to about 25 units per gram of starch (dry basis) under conditions of pH and temperature set out earlier herein. Thermamyl is characterized by the following properties:
   (a) it is thermally stable;
   (b) it is active throughout a wide range of pH; and
   (c) its activity and heat stability are less dependent than other alpha-amylases on the presence of added calcium ion.

Typical analyses of three different Thermamyl preparations are as follows:

|  | Thermamyl 60 | Thermamyl 120 | Thermamyl |
|---|---|---|---|
| Dry Substance, % | 35.4 | 98.8 | 94.8 |
| Alpha-amylase activity, U/g (as is) | 1,156 | 2,105 | 9,124 |
| Protein, % d.b. | 26.5 | 21.2 | 21.2 |
| Ash, % d.b. | 60.1 | 91.2 | 64.4 |
| Calcium, % d.b. | 0.04 | 0.72 | 4.9 |
| Sodium % d.b. | 12.3 | 12.2 | — |

Still other sutable alpha-amylases which are available include the following:

TABLE I

| Enzyme Preparation | Company | Form | Activity |
|---|---|---|---|
| Rhozyme H-39 | Rohm & Haas | Powder | 4,874 U/g |
| Takamine HT-1000 | Miles | Powder | 3,760 U/g |
| Tenase | Miles | Liquid | 2,043 U/ml |
| Dex-Lo MM | Wallerstein | Liquid | 1,213 U/ml |
| Novo SP-96 | Novo | Powder | 7,310 U/g |
| Novo *B. subtilis* | Novo | Liquid | 1,599 U/ml |
| Kleistase GM-16 | Daiwa Kasai | Powder | 26,593 U/g |
| Kleistase L-1 | Daiwa Kasai | Liquid | 1,918 U/ml |
| Papidase SP-250 | Societe "Rapidase" France | Powder | 11,655 U/g |

The amount of bacterial alpha-amylase to be used ranges from about 0.1 to about 25 units per gram of starch (dry basis). The use of larger amounts provides no practical advantage; the increased starch solubilization which results from the use of more than 25 units per gram does not justify the additional cost of enzyme. The optimum quantity of alpha-amylase depends upon the quantity of the saccharification enzyme, such as glucoamylase, and/or beta-amylase, and vice versa. A preferred range of concentration of alpha-amylase is from about 1.0 to about 10 units per gram of starch (dry basis).

The alpha-amylase activity of an enzyme is determined as follows:

The enzyme is allowed to react with a standard starch solution under controlled conditions. Enzyme activity is determined by the extent of starch hydrolysis, as reflected by a decrease in iodine-staining capacity, which is measured spectrophotometrically. The unit of bacterial alpha-amylase activity is the amount of enzyme required to hydrolyze 10 mg. of starch per minute under the conditions of the procedure. The method is applicable to bacterial alpha-amylases, including industrial preparations, except materials which possess significant saccharifying activity.

From 0.3 to 0.5 gram of solid sample or from 0.3 to 1.0 ml. of a liquid sample is dissolved in a sufficient quantity of 0.0025 M aqueous calcium chloride to give an enzyme solution containing approximately 0.25 unit of activity per ml.

A mixture of 10 ml. of 1% Lintner starch solution, equilibrated to 60° C, and 1 ml. of the enzyme sample to be tested is mixed and held in a 60° C constant temperature bath for exactly 10 minutes. A 1-ml. sample is removed and added to a mixture of 1 ml. of 1 M aqueous hydrochloric acid and about 50 ml. of distilled water. The iodine-staining capacity of such acidified sample then is determined by adding 3.0 ml. of 0.05% aqueous iodine solution, diluting to 100 ml. with distilled water, and mixing well. The absorbance of the solution, relative to that of distilled water, is measured at 620 nm, in a 2-cm. cell. A similar measurement is made of the standard starch solution (to which water is added instead of the enzyme solution) to provide a blank absorbance.

The enzyme activity, in units/gram or /ml. is equal to $$\frac{(\text{Blank Absorbance} - \text{Sample Absorbance}) \times \text{Dilution Factor} \times 50}{\text{Blank Absorbance} \times 10 \times 10}$$

For glucose production the glucoamylase may be any of the well-known fungal amylase preparations, particularly those derived from members of the *Aspergillus* genus, the *Endomyces* genus or the *Rhizopus* genus. A particularly preferred glucoamylase is that available from the process described in U.S. Pat. No. 3,042,584 (Kooi et al) whereby a fungal amylase preparation is freed of undesired transglucosidase activity by treatment in an aqueous medium with a clay material. The amount of glucoamylase to be used ranges from about 0.05 unit to about 5.0 units per gram of starch (dry basis). Preferably, on an enzyme cost/performance basis, about 0.1 to about 0.3 unit of glucoamylase per gram of starch (dry basis) is used.

Glucoamylase activity units are determined as follows:

The substrate is a 15–18 D.E. acid hydrolysate of corn starch dissolved in water and diluted to 4.0 grams of dry substance per 100 ml. of solution. Exactly 50 ml. of the solution is pipetted into a 100 ml. volumetric flask. To the flask is added 5.0 ml. of 1.0 molar sodium acetate-acetic acid buffer (pH: 4.3). The flask is placed in a water bath at 60° C and after 10 minutes the proper amount of enzyme preparation is added. At exactly 120 minutes after addition of the enzyme preparation the solution is adjusted to a phenolphthalein end-point with one normal sodium hydroxide. The solution is then cooled to room temperature, and diluted to volume. A reducing sugar value, calculated as dextrose, is determined on the diluted sample and on a control with no enzyme preparation added. Glucoamylase activity is calculated as follows:

$$A = S - B/2 \times E$$

where

A = glucoamylase activity units per ml. (or per gram) of enzyme preparation.
S = reducing sugars in enzyme converted sample, grams per 100 ml.
B = reducing sugars in control, grams per 100 ml.
E = amount of enzyme preparation used, ml (or grams).

"S" should not exceed 1.0 grams per 100 ml.

To saccharify for the production of high maltose syrups and/or syrups containing disaccharides and trisaccharides, a maltogenic enzyme is used as the saccharifying enzyme.

The maltogenic enzyme, i.e., beta-amylase, may be derived from malted grains such as barley, sorghum, soybeans, sweet potatoes, or wheat. Barley malt is available from a number of commercial sources under various proprietary names, e.g., Fromalt 72 and malt amylase PF. Biozyme M, a fungal enzyme, is also useful. The total amount of beta-amylase to be used in the saccharification steps, for the production of high maltose syrup, ranges from about 0.1 unit to about 5 units per gram of starch (dry basis).

Beta-amylase activity units are determined as follows:

A 5.00-gram sample of beta-amylase material finely ground so as to pass a 20-mesh screen, is placed in a 100 ml. volumetric flask and suspended in 70–80 ml. of distilled water. This mixture is stirred for 3 hours at room temperature, diluted to exactly 100 ml. with distilled water, and filtered by gravity through a Whatman #12 filter paper. A 10-ml sample of the enzyme extract (filtrate) is diluted with distilled water to 100 ml.

An approximately 8% (by weight) solution of a corn starch hydrolysate having a D.E. of 15–20 is prepared by weighing ($\pm$ 0.01 gram) a quantity of an aqueous solution of such starch hydrolysate so as to provide about 40.0 grams of dry material. This is transferred quantitatively to a 500-ml. volumetric flask, and diluted to volume and mixed thoroughly. A 50.0 ml. sample of such starch hydrolysate solution is pipetted into a 100-ml. volumetric flask and 5 ml. of sodium acetate buffer solution is added. The temperature of the resulting solution is raised to 50° C. whereupon an aliquot portion of the above diluted enzyme extract is pipetted into the flask. A similar, blank solution, i.e., wherein distilled water is substituted for the diluted enzyme extract, is prepared.

After 55–57 minutes, 3 drops of phenolphthalein indicator is added to each flask. After exactly 60 minutes has elapsed, the flasks are removed from the 50° C. temperature bath and immediately neutralized to the first faint pink coloration by the addition of 1% aqueous sodium hydroxide solution, plus an additional 0.5 ml. The contents of the flask are cooled to room temperature, then diluted to volume with distilled water and mixed thoroughly. The reducing sugar content of 5.0-ml. aliquots are determined using the Schoorl method. The calculation of enzyme activity, in units per gram of dry starch, is made as follows:

A. Reducing sugar (R.S.) Contents:

$$\text{Total } R.S., g = \frac{(\text{mg } R.S. \text{ in 5-ml. aliquots}) \times 20}{1000}$$

B. Enzyme Activity, Units/g =

$$= \frac{\text{Sample } R.S., g - \text{Blank } R.S., g \times 10 \times 100}{\text{Sample Wt., g} \times \text{Aliquot Volume, ml.}}$$

In some instances it is desirable to incorporate an isoamylase enzyme such as pullulanase into either or both the solubilization step or the saccharification step of the process. The amount of isoamylase may range from about 0.10 unit to about 0.5 unit per gram of starch. The use of pullulanase, for example is effective to increase solubilization and to facilitate filtration of the final hydrolyzate.

The preferred mode of operating the process of the invention involves the preparation of an aqueous slurry of granular starch and an alpha-amylase. The slurry may contain only these components or it may also contain one or more saccharifying enzymes of the type discussed above. The presence of glucoamylase or beta-amylase in the slurry increases the rate of solubilization of the granular starch and thus shortens the required duration of the step. The desirability of incorporating one or more of these saccharifying enzymes in the aqueous slurry of this stage of the process is a matter of balancing the additional cost of the enzymes against such beneficial influence. When thus used in this solubilization step, the amount of saccharifying enzyme ranges from about 0.01 to about 0.30 unit of glucoamylase per gram of starch (dry basis) or from about 0.1 units to about 5 units of beta-amylase per gram of starch (dry basis), as the case may be.

The pH is governed by the optimum pH of the particular alpha-amylase which is used. Thermamyl exhibits its optimum activity at a pH of 5 to 7; Rapidase exhibits its optimum activity at a pH of about 6.0; etc. In those instances, as discussed later herein, where a saccharifying enzyme is included with the alpha-amylase the lower pH at which these saccharifying enzymes exhibit their optimum activity (and at which they are stable) requires a modification of the pH which is best employed when the alpha-amylase is used alone. Glucoamylase, for example, exhibits its optimum activity at a pH of 4.0 to 4.5. Beta-amylases exhibit their optimum activity at a somewhat higher pH, but still below that at which alpha-amylase is most active. It is thus necessary to select a pH at which the alpha-amylase when used alone is most active, or at a pH at which the several enzymes, when used in combination, exert their overall optimum activity.

The temperature of the reaction mixture of the process herein for solubilization should as indicated be between the normal initial gelatinization temperature and the actual gelatinization temperature of the starch. Ordinarily, the temperature will be at the upper end of this range. A particular advantage of the process is the fact that high temperatures are avoided. This permits a considerable savings in the cost of supplying heat to the process and minimizes the formation of color bodies with a subsequent savings in refining costs. It is interesting to note that the process can be carried out at temperatures above the normal initial gelatinization temperature of a starch without noticeable gelatinization as evidenced by an increase in viscosity. Despite the fact that corn starch, for example, is considered to have a gelatinization temperature range of 62°–72° C, i.e., its "normal" gelatinization temperature range, the process of the present invention may be carried out with corn starch at temperatures up to about 80° C without any noticeable increase in viscosity. As a matter of fact, it usually is desirable to carry out the process at these higher temperatures, because of the increased rate and extent of solubilization of starch.

The temperature of the solubilization of the granular starch should be from about 40° C up to the actual gelatinization temperature of the starch, i.e., about 80° C. Preferably, the solubilization temperature will be within the range of from about 55° to about 75° C. A particular advantage of this hydrolysis method is the fact that prolonged high temperatures are avoided, with the advantages already discussed.

When the reaction is conducted at temperatures exceeding the normal initial gelatinization temperature of the starch, it is desirable to have hydrolysis products present during the reaction. One way of accomplishing this is to add the enzyme(s) to the starch at a temperature equal to or lower than the initial gelatinization temperature, and then to heat the mixture to the desired temperature. In this manner, the hydrolysis products inhibit the gelatinization of the granular starch at the higher temperatures and the unsolubilized starch remains in granular form. Thus, the residual starch can be easily filtered.

The selection of pH depends upon the particular enzymes used in the process. Ideally, the thinning enzyme and the saccharifying enzyme would exhibit their optimum activities at the same pH, but as a practical matter this is unlikely. Glucoamylase is, of course, the saccharifying enzyme that is used for the production of glucose syrups and dextrose, and its optimum activity is exhibited at a pH of about 4.5. Thermamyl, on the other hand, exhibits its optimum activity at a pH of 5.5 to 7 and is not sufficiently active at a pH below 5 to promote the desired starch solubilization. The same is true generally with respect to other alpha-amylases. Accordingly, a suitable pH for the purpose of glucose or dextrose production is one falling within the range of from about 5.0 to about 7.0, i.e., where the glucoamylase and alpha-amylase each are suitably active.

As previously discussed, the process of the invention may be operated by solubilization of the granular starch with a bacterial alpha-amylase enzyme preparation in a first step which may alternatively include a saccharifying enzyme such as glucoamylase or beta-amylase; and this first step is thereby followed by a saccharification or conversion step. In such a process, the temperature during the solubilization step is preferably in the range of from about 55° to about 75° C. Following the solubilization step, the temperature may be lowered to from about 50° to about 65° C., and this temperature may be maintained for a period of time ranging from about 40 to about 120 hours. Also, the pH is preferably adjusted so as to provide optimum saccharification conditions. If glucoamylase is the saccharifying enzyme, then the pH is lowered to within the range of from about 4.0 to about 4.5. If beta-amylase is the saccharifying enzyme, then the pH is adjusted within the range of from about 4.0 to about 6.0. In some instances the pH of all of the steps may desirably be the same.

A preferred embodiment of the invention involves the method of ultrafiltration. By selection of a suitable semi-permeable membrane, the enzyme and unreacted starch may be completely retained by the membrane while the dextrose product, being of lower molecular weight, passes through as it is formed. Ultrafiltration is discussed in "New Separation Technique for the CPI", Chemical Engineering News, 64, No. 12 (1968).

In another preferred embodiment the starch conversion mixture contains an anionic surfactant. In certain concentrations the surfactant enhances the degree of solubilization and yield of dextrose, i.e., in concentrations ranging from about 0.01 to about 1.0%. Best results are obtained with a concentration of anionic surfactant ranging from about 0.05 to about 0.50%. Typical anionic surfactants useful herein include sodium lauryl sulfate, sodium dodecylbenzene sulfonate, sodium wax-substituted naphthalene sulfonate, sodium stearate, and triethanolamine alkyl sulfonates where the alkyl group is derived from alcohols produced by the reduction of tallow or coconut oil glycerides. In general, the anionic dispersants herein are water-soluble salts having an alkyl group containing from about 8 to about 20 carbon atoms, a sulfonic acid or sulfuric acid ester radical, and either sodium, potassium, ammonium, or aliphatic amine having fewer than 10 carbon atoms, as the cation.

In still another preferred embodiment the process is carried out in two stages, with respect to the pH of the starch conversion mixture. The first stage conforms to that described above, i.e., the pH is maintained at from about 5.0 to about 7.0, until at least about 10% of the starch has been solubilized, and preferably until the solubilization of starch begins to level off. This occurs in the usual instance after about 16 hours. The conversion mixture may be filtered at this point, if desired. The pH is adjusted down to within the range of from about 4.0 to about 5.0. Within this range the activity of the glucoamylase is greater than at higher pH's and the overall result is a somewhat increased yield of dextrose.

A particularly preferred embodiment, resulting in the formation of substantial proportions of dextrose, comprises the steps of (1) agitating a mixture of a granular starch, water and a bacterial alpha-amylase, at a temperature between the normal initial gelatinization temperature of the starch and the actual gelatinization temperature of the starch and at a pH of from about 5.0 to about 7.0, to convert at least 10% of the starch to a soluble hydrolysate; and (2) adjusting the temperature to 50°-65° C and the pH to 4.0-4.8, and adding glucoamylase to saccharify the soluble hydrolysate. Step (1) generally requires about 12 hours; step (2) on the other hand ordinarily will require a much longer time, i.e., from about 24 hours to about 120 hours. In some instances, it is desirable to add glucoamylase to the mixture in step (1). The amounts of alpha-amylase and glucoamylase used in step (1) are the same as specified earlier herein for the conversion of granular starch to soluble hydrolysate in one step.

The above additional amount of glucoamylase employed in the second stage ranges from about 0.1 to about 1.0 units of activity per gram of dry starch.

The starch hydrolysis product may be worked up in the usual manner, i.e., by concentration and crystallization.

A typical procedure for an enzymatic hydrolysis as described above is as follows:

EXAMPLE 1

A slurry containing 125 parts of starch (dry basis) and 350 parts of distilled water is prepared in a 1-liter stainless steel beaker. Calcium is added if desired (as in the case of the use of alpha-amylases other than Thermamyl), in the form of an aqueous calcium chloride solution containing 40 mg. of calcium per milliliter, to increase the total amount of calcium present in the slurry by 100 ppm (the starch contains some calcium, and so does the alpha-amylase). The pH is adjusted to 5.5 by the addition of dilute aqueous sodium hydroxide; bacterial alpha-amylase and glucoamylase are added and the total weight of the slurry adjusted to 500 parts by the addition of distilled water. The beaker is placed in a water bath, the contents stirred and heated to 60°-75° C and held at that temperature for the indicated time of reaction; the pH is checked periodically and readjusted to 5.5 when necessary. The product then is filtered and the filter cake washed, dried and weighed to ascertain the portion of starch remaining unsolubilized. The following data obtained via this procedure is illustrative. In each case the data is based on use of a 25-30% aqueous slurry of granular corn starch at a pH of 5.5 and a temperature of 65°-75° C.

When the conversions are conducted at 65°-75° C (well above the reported initial gelatinization temperature of corn starch) the non-solubilized starch retains its granular nature throughout the course of the conversion.

TABLE II

| Run No. | Starch % Conc. | Enzyme-Dose[a] BAA[b] GA[c] | | Time Hrs. | Temp. | % Sol.[d] |
|---|---|---|---|---|---|---|
| 1 | 30 | 2 Th | 0.25 | 24 | 65° C | 74.8 |
| 2 | 30 | 2 Th | 0.14 | 24 | 65° C | 76.4 |
| 3 | 30 | 2 Th | 0.25 | 24 | 70° C | 89.2 |
| 4 | 30 | 2 Th | 0.14 | 24 | 70° C | 88.7 |

TABLE II-continued

| Run No. | Starch % Conc. | Enzyme-Dose[a] BAA[b] GA[c] | | Time Hrs. | Temp. | % Sol.[d] |
|---|---|---|---|---|---|---|
| 5 | 25 | 2 Th | 0.14 | 26[f] | 75° C | 97.6 |
| 6 | 25 | 2 Th | 0.14 | 50[g] | 75° C | 94.8 |
| 7 | 25 | 10-B-221[h] | 0.14 | 26[f] | 75° C | 96.1 |
| 8 | 25 | 10-B221 | 0.14 | 50[g] | 75° C | 96.4 |
| 9 | 25 | 2 Th | 0.14 | 25 | 65° C | 80.4 |
| 10 | 25 | 2 Th | 0.14 | 24 | 70° C | 89.2 |
| 11 | 25 | 2 Th | 0.14 | 22 | 75° C | 93.2 |
| 12 | 30 | 2 Th | 0.25 | 48[i] | 65° C | 77.0 |

[a] units per gram of starch
[b] bacterial alpha-amylase
[c] glucoamylase
[d] % of starch solublized
[e] Thermamyl
[f] 60-75° C for 2 hours, 75° C for 24 hours
[g] 60° C for 24 hours, then as in [f]
[h] derived from a *Bacillus subtilis* microorganism and having an activity of 3910 U/g
[i] 60° C for 24 hours, 65° C for 24 hours

EXAMPLE 2

The solubilizing influence of alpha-amylases alone on granular starch, at the elevated temperatures of this invention is shown by the data in Table III. In each case a starch slurry containing 25 or 30% of granular starch is agitated with an alpha-amylase at 60°-75° C, at a pH of 5.5 for about 25 hours.

TABLE III

| Run No. | Starch % Conc. | BAA Dose[a] | Time Hrs. | Temp. | % Sol.[b] |
|---|---|---|---|---|---|
| 1 | 30 | 2 Th | 24 | 65° C | 61.1 |
| 2 | 30 | 2 Th | 24 | 70° C | 72.9 |
| 3 | 25 | 1 Th | 26[c] | 75° C | 54.7 |
| 4 | 25 | 2 Th | 26[c] | 75° C | 96.6 |
| 5 | 25 | 10 Th | 26[c] | 75° C | 97.3 |
| 6 | 25 | 1 Tenase | 26[c] | 75° C | 89.3 |
| 7 | 25 | 2 Tenase | 26[c] | 75° C | 93.0 |
| 8 | 25 | 10 Tenase | 26[c] | 75° C | 95.2 |

[a] units per gram of starch
[b] % of starch solubilized
[c] 60-75° C for 2 hours, 75° C for 24 hours

EXAMPLE 3

As pointed out earlier herein, a particularly preferred embodiment of the invention involves the preparation of dextrose via a 2-stage process; in the first stage the granular starch is converted to a starch hydrolysate by treatment with an alpha-amylase, either alone or in combination with glucoamylase, at a temperature between the normal initial gelatinization temperature and the actual gelatinization temperature of the starch and at a pH of 5.7; then in the second stage the temperature is lowered to 50°-65° C, the pH is lowered to 4.0-4.8 and additional glucoamylase is added. These conditions are maintained for 24-120 hours. Data obtained from such a 2-stage process, wherein the combination of alpha-amylase and glucoamylase is used in the first stage is shown in Table IV. In each case the starch slurry contains 25% starch and, in the second stage, an additional 0.14 unit of glucoamylase is added after adjusting the temperature to 60° C and the pH (from 5.5 in the first stage) to 4.3.

TABLE IV

| Run No. | 1st Stage | 2nd Stage[a] | % Dextrose[b] |
|---|---|---|---|
| 1 | as in No. 5, Table II | 120 hrs. | 95.3 |
| 2 | as in No. 6, Table II | 96 hrs. | 95.6 |
| 3 | as in No. 7, Table II | 120 hrs. | 94.9 |
| 4 | as in No. 8, Table II | 96 hrs. | 96.2 |
| 5 | as in No. 9, Table II | 55 hrs. | 97.6 |
| 6 | as in No. 10, Table II | 90.5 hrs. | 98.4 |
| 7 | 2 Th + 0.14 GA at 73° C for 24 hrs | 42 hrs. | 96.5 |
| 8 | 2 Th + 0.14 GA at 73° C | | |

TABLE IV-continued

| Run No. | 1st Stage | 2nd Stage[a] | % Dextrose[b] |
|---|---|---|---|
| 9 | for 12 hrs.<br>2 Th + 0.14 GA at 75° C<br>for 12 hrs. | 82 hrs.<br><br>86 hrs. | 96.5<br><br>96.8 |
| 10 | as in No. 11, Table II | 80 hrs. | 95.8 |

[a] 0.14 GA at 60° C
[b] based on solids in the filtrate

EXAMPLE 4

Additional data obtained from similar runs wherein alpha-amylase is used alone in the first stage is set forth in Table V. In each case the starch slurry contains 30% of starch.

TABLE V

| Run No. | 1st Stage | 2nd Stage | % Sol. | % Dextrose[a] |
|---|---|---|---|---|
| 1 | 2 Th at 60-75 for 2 hrs.<br>75° C for 24 hrs.; pH<br>5.5 | 0.14 GA at 60° C<br>for 120 hrs. pH<br>4.3 | 97.2 | 95.3 |
| 2 | 2 Th at 60° C for 24 hrs.,<br>60-75° C for 2 hrs., 75° C<br>for 24 hrs., pH 5.5 | 0.14 GA at 60° C<br>for 96 hrs.; pH<br>4.3 | 96.2 | 95.2 |
| 3 | 10 B-221 at 60-75° C for<br>2 hrs., 75° C for 24 hrs;<br>pH 5.5 | 0.14 GA at 60° C<br>for 120 hrs.; pH<br>4.3 | 94.2 | 94.8 |
| 4 | 10-B-221 at 60° C for 24 hrs.,<br>60-75° C for 2 hrs., 75° C<br>for 24 hrs.; pH 5.5 | 0.14 GA at 60° C<br>for 96 hrs.; pH<br>4.3 | 95.1 | 93.3 |
| 5 | 2 Kleistase at 60-75° C for<br>2 hrs., 75° C for 24 hrs.;<br>pH 5.5 | 0.14 GA at 60° C<br>for 96 hrs.; pH<br>4.3 | 93.2 | 94.8 |
| 6 | 10 Kleistase at 60-75° C<br>for 2 hrs., 75° C for 24<br>hrs.; pH 5.5 | 0.14 GA at 60° C<br>for 96 hrs.; pH<br>4.3 | 94.9 | 93.2 |

[a] based on solids in the filtrate

When granular starch is hydrolyzed by the action of bacterial alpha-amylase and saccharified by the action of a maltogenic enzyme such as beta-amylase, alone or in combination with an isoamylase such as pullulanase, a hydrolysate product containing a high content of disaccharides (maltose) and trisaccharides (maltotriose) is obtained. The exact composition of the hydrolysate will vary depending on the exact conditions under which the process is performed, i.e., the quantity of enzymes used and the use of a pullulanase enzyme. In Table VI, below, the essential characteristics of the novel high maltose-maltotriose hydrolysates produced by the present invention are shown.

TABLE VI
CHARACTERISTICS OF HIGH MALTOSE-MALTOTRIOSE PRODUCTS PERCENT, DRY BASIS

| Ranges | D.E. | Monosac-<br>charides[a] | Disac-<br>charide[b] | Trisac-<br>charides[c] | $DP_4^{+d}$ |
|---|---|---|---|---|---|
| Typical | 40-60 | 0-10 | 35-60 | 25-50 | 25 |
| Preferred | 40-55 | 0-5 | 40-55 | 30-45 | 20 |
| Most<br>Preferred | 40-50 | 0-3 | 45-50 | 30-40 | 15 |

[a] Dextrose
[b] Maltose
[c] Maltotriose
[d] Polysaccharides, e.g., maltotetrose and higher.

In order to describe more clearly the nature of the present invention and the preparation and characteristics of the above described unique hydrolysates, the following examples are hereinafter provided. It should be understood that this is done solely by way of example of the invention and is intended neither to delineate the scope of the invention nor limit the ambit of the appended claims.

EXAMPLE 5

The following example illustrates the preparation of hydrolysate products having a high concentration of maltose and maltotriose. The unique hydrolysate is obtained by using a combination of alpha-amylase and ground barley malt. The addition of the enzyme, pullulanase, increases the formation of maltose and maltotriose.

A typical procedure for preparing the unique high maltose-maltotriose products of the invention is as follows:

A slurry containing 125 grams (d.b.) corn starch in 300-350 ml of water is prepared in a tared beaker. The slurry is attempered in a 60° C water bath and the pH adjusted to 5.5 with 0.1 N sodium hydroxide. Weighed amounts of Novo bacterial alpha-amylase and ground barley malt (Froedtert Grade 72-H) are added in amounts equivalent to 2 to 20 U of alpha-amylase and 0.1 to 1.0% d.b. malt on a starch d.s. basis. The addition of one unit of pullulanase per g.d.s. also has a beneficial effect. If the alpha-amylase used is calcium dependent, the digest should contain 100-200 ppm of calcium ions. Calcium may be added as an aqueous solution of the chloride salt. The weight of the slurry is then adjusted to 500 grams by the addition of water to give a starch concentration of about 25% w/w. The digest is then returned to the 60° C water bath and agitated slowly for 24 hours. The pH value is checked periodically and readjusted to 5.5 if necessary. At the end of the stipulated reaction time, water lost by evaporation is replaced and the digest is filtered (Vacuum No. 4 Buchner, No. 1 Whatman Paper). A 200 ml portion of the filtrate is transferred to an Erlenmeyer flask, sealed with a Bunsen valve and heated for 15 minutes in a boiling water bath to inactivate the enzymes present. The filtrate is analyzed for dry substance, D.E., and carbohydrate composition.

The residual starch cake is washed with about 500 ml of water, dried overnight in an air oven at 50° C. weighed and analyzed for moisture. The percentage of starch solubilized during the digestion is calculated as follows:

$$\% \text{ Starch} = \frac{125 \text{ g} - \text{Wt of residual starch, g} \times \text{decimal } ds \times 100}{125 \text{ g.}}$$

Several granular corn starch digestions are conducted as described using various combinations of bacterial alpha-amylase, ground barley malt and pullulanase. Thermamyl 60 (a liquid bacterial alpha-amylase available from the Novo Enzyme Corporation) is used as one of the alpha-amylase enzyme preparations, and B-221 is an alpha-amylase derived from a *Bacillus subtilis* microorganism prepared by CPC International Inc. Pullulanase is a debranching enzyme produced by members of the bacterial species *Aerobacter aerogenes* when suitably incubated under conditions of aerobic culture. The results obtained are shown below.

TABLE VII

| Enzyme Dosage, u/g d.s. | | | Starch Solubilized, % d.b. | Filtrate, d.s. | D.E. | Filtrate Composition % d.b. | | |
|---|---|---|---|---|---|---|---|---|
| Alpha-Amylase | Malt | (% d.b.) Pullulanase | | | | DP-1 | HP-2 | DP-3 |
| | | | Novo-Alpha-Amylase | | | | | |
| 5 | 0.5 | 0 | 60.5 | 19.3 | 43 | 3 | 45 | 33 |
| 5 | 0.5 | 1 | 61.1 19.7 | 46 | 3 | 52 | 37 | |
| 20 | 0.5 | 0 | 66.2 | 20.9 | 43 | 5 | 41 | 33 |
| 20 | 0.5 | 1 | 67.0 | 21.4 | 47 | 5 | 47 | 38 |
| | | | CPC B-221 Alpha-Amylase | | | | | |
| 20 | 0.5 | 0 | 58.4 | 19.2 | 45 | 5 | 48 | 21 |
| 20 | 0.5 | 1 | 56.7 | 19.5 | 49 | 5 | 56 | 27 |

Conditions: 25% w/w corn starch, 60° C, 24 hours, pH 5.5, 1000 ppm added calcium.

The above results and data reveal that the process of the invention will solubilize more than 56% of the granular corn starch (i.e., from about 56% to about 67%, d.b.) using the dual enzyme system comprised of bacterial alpha-amylase and the maltogenic enzyme (barley malt). It can also be seen from the data that the hydrolysates have a D.E. in the range of from about 40 to about 60, preferably in the range of from about 40 to about 55 and more preferably in the range of from about 40 to about 50. One of the unique characteristics of the products is that they contain about 35% to about 60%, by weight dry basis of maltose, from about 25% to about 50%, by weight, dry basis, maltotriose and less than about 10% dextrose. The remainder of the product is polysaccharide having a degree of polymerization of four or more. This remainder should be less than 25%, by weight, dry basis polysaccharide. The unique hydrolysates can be typically characterized as containing a combined maltose and maltotriose content of from about 60% to about 95% by weight, dry basis, preferably the combined content of maltose and maltotriose will be from about 70% to about 90%, by weight, dry basis, and the content of dextrose will preferably be less than about 5%, by weight dry basis.

One of the most unusual characteristics of the high maltose-maltotriose products of the invention is the presence of a large quantity (i.e., at least about 25%, by weight, dry basis) of maltotriose and a low content of dextrose. The high maltose hydrolysates of the prior art generally contain about 20%, by weight, dry substance, or less maltotriose.

The above data also demonstrates that the addition of an isoamylase such as pullalanase to the digest increases the concentration of the maltotriose in the composition.

EXAMPLE 6

In this example the hydrolysate composition obtained by digesting a soluble starch substrate with a combination of bacterial alpha-amylase and a maltogenic enzyme is determined to compare the results obtained under the same conditions using granular starch as the substrate.

The digestions of 25% of w/w of a waxy maize starch hydrolysate having a D.E. of 4.8 (the liquified waxy starch hydrolysate is prepared by bacterial alpha-amylase enzyme liquefaction of waxy maize starch) are conducted with combinations of bacterial alpha-amylase (Thermamyl 60 or CPC B-221), malt and pullulanase at 60° C and at a pH of 5.5 The procedure employed in this example is the same as described in Example 5. The hydrolysate saccharide compositions are compared to the data attained with a granular starch hydrolysate from Table VI. The comparative data are shown in Table VII below.

TABLE VIII

Digestion of Liquified and Granular Starch with a Combination of Bacterial Alpha Amylase and Maltogenic Enzyme

| Substrate | Digestion Time Hrs. | D.E. | Filtrate Composition, % d.b. | | |
|---|---|---|---|---|---|
| | | | DP-1 | DP-2 | DP-3 |
| | Thermamyl 60 + Malt [a] | | | | |
| Hydrolysate[b] | 24 | 39 | 3 | 46 | 23 |
| Hydrolysate[b] | 48 | 40 | 3 | 48 | 23 |
| Granular Corn Starch[c] | 24 | 43 | 3 | 45 | 33 |
| | Thermamyl 60 + Malt + Pullulanase [a] | | | | |
| Hydrolysate [b] | 24 | 46 | 2 | 59 | 33 |
| Hydrolysate [b] | 48 | 47 | 3 | 69 | 34 |
| Granular Corn Starch [c] | 24 | 46 | 3 | 52 | 37 |
| | B-221 + Malt [a] | | | | |
| Hydrolysate [b] | 24 | 39 | 3 | 51 | 18 |
| Hydrolysate[b] | 48 | 39 | 3 | 51 | 18 |
| Granular Corn Starch [c] | 24 | 45 | 5 | 48 | 21 |
| | B-221 + Malt + Pullulanase[a] | | | | |
| Hydrolysate [b] | 24 | 45 | 3 | 60 | 26 |
| Hydrolysate [b] | 48 | 46 | 2 | 62 | 26 |
| Granular Corn Starch | 24 | 49 | 5 | 56 | 27 |

[a] Enzyme dosages - 5 units of alpha-amylase/g.d.s. except for B-221-granular starch where 20 u/g.d.s. is used. one (1) unit of pullulanase /g.d.s.; and 0.5% d.b. malt are used as indicated.
[b] Waxy maize starch hydrolysate, 4.8. D.E.
[c] At 57% to 61% solubilization.

The above data indicate that under identical conditions higher levels of maltotriose are produced from granular starch as compared to products obtained from liquefied starch as the substrate material. It can be seen that the addition of pullulanase increases the di- and trisaccharide levels, and Thermamyl 60 produces more maltotriose than B-221 bacterial alpha-amylase.

EXAMPLE 7

The above example is repeated with a combination of Thermamyl L-60 and soybean (as the maltogenic enzyme preparation). The digestion is conducted at a pH of 5.5 and 6.5, (two (2) digestions). The results of these runs are compared with the previous example wherein malt was used as the maltogenic enzyme. The results are set forth in Table VIII.

TABLE IX

| Enzymes[a] | pH | D.E. | Filtrate Composition, % d.b. | | | |
|---|---|---|---|---|---|---|
| | | | DP-1 | DP-2 | DP-3 | DP-4 |
| Thermamyl L-60 + Malt | 5.5 | 43 | 3 | 45 | 33 | 19 |
| Thermamyl L-60 + Soybean | 5.5 | 45 | 3 | 46 | 35 | 16 |
| Thermamyl + Soybean | 6.5 | 43 | 4 | 45 | 38 | 13 |

[a]Conditions: 25% w/w corn starch 60° C, 24 hours; 5 Thermamyl L-60 u/g.d.s; 0.5% ground malt or soybean

EXAMPLE 8

In this example the effect of a surfactant such as sodium dodecyl sulfate is determined by preparing high maltose-maltotrose hydrolysates by the digestion process of the invention.

Corn starch slurries at 25% w/w are prepared containing 0.1% sodium dodecyl sulfate on the basis of starch (d.b.). The digestions are conducted using a combination of 5 Thermamyl u/g.d.s and 0.5% d.b. ground barley malt with and without pullulanase (1 u/g.d.s.) at 60° C, pH 5.5 for 24 hours. The results of the runs are compared with the results obtained from Example 5. These results are set forth in Table IX.

TABLE X

| SDS[a] | Starch Solubilized, % d.b. | % d.b. %, d.s. | Filtrate Composition, | | | |
|---|---|---|---|---|---|---|
| | | | D.E. | DP-1 | DP-2 | DP-3 | DP-4 |
| | | Thermamyl + Malt | | | | | |
| Yes | 69.6 | 19.88 | 39 | 0 | 41 | 31 | 2 |
| No | 61.1 | 19.31 | 43 | 3 | 45 | 33 | 1 |
| | | Thermamyl + Malt + Pullulanase | | | | | |
| Yes | 69.8 | 19.88 | 42 | 0 | 43 | 35 | 1 |
| No | 60.5 | 19.68 | 46 | 3 | 52 | 37 | 1 |

(a Sodium dodecyl sulfate
(b Conditions: 25% w/w corn starch; 60° C, P M 5.5 24 hrs. b Thermamyl L-60 u/g.d.s 0.5% Malt, d.b., 1 Pullulanase u/g.d.s. 0.1% d.b.SDS.

The above data indicates that the addition of a surfactant increases starch solubilization by about 9% and reduces the D.E. (which is believed to be due to partial inactivation of the malt enzymes).

EXAMPLE 9

This example illustrates the production of the high maltose-maltotriose hydrolysates by the two-stage temperature process of the invention.

Corn starch is slurried in water at 25% w/w and mixed with 2 Thermamyl L-60 w/g.d.s. at a pH of 6.0. The mixture is heated to 60° C initially and then heated from 60° C to 75° C in 2 hours. The slurry is held at 75° C with agitation for 22 hours to obtain a solubilization of 94% or more. Portions of the unfiltered digest are then converted (saccharified) with various enzymes. The results are set forth in Table X.

TABLE XI

Hydrolysates Obtained by Saccharification of 75° C. Solubilized Granular Corn Starch

| Saccharification [a] Enzyme | pH | Total Solubilization %, d.b. | Filtrate Composition, % d.b. | | | |
|---|---|---|---|---|---|---|
| | | | d.s. | D.E. | DP-1 | DP-2 | DP-3 |
| Barley Malt, 0.5% | 5.5 | 95.3 | 25.8 | 46 | 8 | 38 | 34 |
| Barley Malt, 0.5% Pullulanase u/g.d.s. | 5.5 | 95.6 | 25.9 | 52 | 8 | 47 | 41 |
| Soybean, 0.5% | 6.0 | 94.9 | 26.1 | 46 | 8 | 37 | 35 |
| Pancreatic alpha-amylase, 1.0% | 5.0 | 95.2 | 25.9 | 61 | 31 | 38 | 14 |
| Rhozyme K-4, 0.05% | 5.0 | 95.4 | 26.4 | 67 | 39 | 41 | 4 | a) Saccharification conditions: 60° C. for 24 hrs.

EXAMPLE 10

In the following example digestions of granular starch are conducted to ascertain the saccharide distribution obtained by solubilization with alpha-amylase alone following the practice of the present invention.

A mixture of granular starch and water at a solids concentration of 30% w/w solids is digested with 2 Thermamyl w/g.d.s. at a pH of 5.5 and 60° C. Solubilizations obtained after 24 and 48 hours digestion are 35.0% and 38.6% respectively. The filtrate saccharide distributions obtained are shown in Table XI.

TABLE XII

| Digestion Time, hrs. | D.E. | Filtrate Saccharide Analysis, %d.b. | | | | | | | |
|---|---|---|---|---|---|---|---|---|---|
| | | 1 | 2 | 3 | 4 | 5 | 6 | 7 | 8 |
| 24 | 34.6 | 7.5 | 13.2 | 18.0 | 5.4 | 30.8 | 2.7 | 3.7 | 18.8 |
| 48 | 35.3 | 8.6 | 14.3 | 18.2 | 5.4 | 29.3 | 2.5 | 3.7 | 10.0 |

The above data establishes that by extending the digestion time from 24 to 48 hours does not result in a significant change in the saccharide composition or a significant change in the D.E. of the hydrolysate. The data further indicates that the process of the invention using alpha-amylase alone produces a large quantity of the DP-5 polysaccharide, i.e., greater than 25% by weight, dry basis and generally at least about 30% by weight, dry basis.

GENERAL

One of the essential features of the process of the present invention is that granular starch is solubilized without any substantial gelatinization of the insoluble starch. In other words, any residual insoluble starch is in essentially granular and ungelatinized form. This aspect of the invention is significant from an economic standpoint because the starch hydrolysate can be easily filtered to remove the residual granular starch if any, and there is no substantial build-up of viscosity due to gelatinization of the starch. The insoluble granular starch cam be easily recovered, and if desired, it can be recycled.

The process of the invention, as described above, can be practiced in a variety of ways. For example, as illustrated in the foregoing description and the examples, the granular starch may be digested with alpha-amylase, alone; providing, that the conditions are such that substantial gelatinization of the starch does not occur. The gelatinization is prevented by the process of the invention by agitating the granular starch and water with the alpha-amylase at a temperature of from about 40°, preferably 50° C. up to the actual gelatinization temperature of the starch. By mixing the granular starch and water with the alpha-amylase at the lower temperatures, i.e., 40° C. up to the actual gelatinization temperature of the starch, soluble hydrolysate products are formed which tend to inhibit the gelatinization of the remaining starch granules. As the digestion continues more soluble starch hydrolysates are formed which enables one to raise the temperature of the mixture, i.e., to a temperature up to about 80° C. Temperatures above about 80° C. are generally avoided since gelatinization of the granular starch will occur, even in the presence of the soluble starch hydrolysate products. Thus, the process of the present invention differs from the prior art processes such as described in U.S. Pat. No. 3,720,583 which employ a thinning or liquefaction step prior to treating the starch with the alpha-amylase enzyme.

As it is demonstrated by the foregoing examples, particular advantages are realized if a saccharification enzyme is employed in conjunction with the alpha-amylase enzyme. The saccharification enzyme in combination with the alpha-amylase enzyme produces substantial beneficial results in solubilizing the granular starch. In practicing the invention, any known saccharification enzyme may be employed. Saccharification enzymes useful in the practice of the invention include those which are capable of hydrolyzing or splitting the linkages in the starch molecule. Examples of saccharification enzymes useful in the practice of the invention in combination with the alpha-amylase enzyme include glucoamylase, beta-amylase, maltase, isomaltase (transglucosidase) etc. Other carbohydrate conversion enzymes can be used in combination with alpha-amylase and the saccharification enzyme or as a post treatment of the resulting starch hydrolysate. These enzymes include glucose isomarase, alpha-1, 6-glucosidase, isoamylase (pullulanase) etc.

As illustrated by the examples and the foregoing discussion, the process of the invention can be conducted by first solubilizing a portion of the granular starch, i.e., at least about 10%, by weight, preferably at least about 50%, by weight, by treating the mixture of granular starch and water with alpha-amylase, and thereafter treating the solubilized starch hydrolysate (which may also include unconverted insoluble starch granules) with at least one saccharification enzyme at a temperature in the range of from about 50° to about 65° C. If desired, the solubilized starch and remaining unconverted insoluble starch may be subjected to a heat treatment (e.g. autoclave) at a temperature of from 100° to about 170° C. to liquefy and/or solubilize any remaining insoluble starch granules prior to the saccharification step. This latter aspect provides certain economics in refining of the final product.

The starch hydrolysates prepared by saccharification with beta-amylase (the high maltose-maltotiose products) may be used in the manufacture of hard candy and lozenges where transparency of the final product is desired. These unique products can also be used as chemical intermediates in preparing useful polyfunctional derivatives or as intermediates in preparing various polymeric compositions which involve a reaction of hydroxyl groups. These products are particularly suited as intermediates in preparing various detergent builders. The high maltose-maltotriose products may also be combined or blended with other materials such as maltodextrins to improve the overall body and decrease the hygroscopicity of the product.

All parts and percentages herein are by weight unless otherwise expressly stated.

While the invention has been described in connection with specific embodiments thereof, it will be understood that it is capable of further modification, and this application is intended to cover any variations, uses or adaptations of the invention following, in general, the principals of the invention and including such departures from the present disclosure as come within known or customary practice in the art to which the invention pertains and as may be applied to the essential features hereinbefore set forth, and as fall within the scope of the invention.

1. An enzymatically produced high maltose-maltotriose starch hydrolysate having a dextrose equivalent value in the range of from about 40 to about 55, and characterized as containing less than about 5%, by weight, dry basis, monosaccharides, from about 40% to about 55%, by weight, dry basis, disaccharides, from about 30% to about 45%, by weight, dry basis, trisaccharides, and about 20%, by weight, dry basis, polysaccharides having a degree of polymerization of four or more.

2. An enzymatically produced high maltose-maltotriose starch hydrolysate having a dextrose equivalent value in the range of from about 40 to about 50, and characterized as containing less than about 3%, by weight, dry basis, monosaccharides, from about 45% to about 50%, by weight, dry basis, disaccharides, and from about 30% to about 40%, by weight, dry basis, trisaccharides, and the remainder being polysaccharides having a degree of polymerization of four or more.

* * * * *

UNITED STATES PATENT AND TRADEMARK OFFICE
CERTIFICATE OF CORRECTION

PATENT NO. : 4,113,509
DATED : Sept. 12, 1978
INVENTOR(S) : Harry Woods Leach et al It is certified that error appears in the above-identified patent and that said Letters Patent are hereby corrected as shown below:

In the Specification:
    Column 4 line 4 (last column under the heading 'Thermamyl' on the first line) delete "94.8" and insert --94.6--;
          line 11, delete "sutable" and insert --suitable--;
          line 22 or last line in 1st column (Table I), delete "Papidase SP-250" and insert --Rapidase SP-250--
    Column 5 line 43, delete "A=S-B/2XE" and insert $--A = \dfrac{S - B}{2 \times E}--$
    Column 9 lines 66-70 (Table II), shift the numbers of 4th column to the left lining up '0.25, 0.14, 0.25, 0.14' under the heading '$GA^C$'
    Column 10 lines 4-10 (Table II - continued) shift the numbers of 4th column to the left lining up '0.25, 0.14, 0.25, 0.14' under the heading '$GA^C$';
          line 15 (Table II) in the notes, footnote g, after 'then as in' insert --f--;
          line 31 (Table III) under the '% Sol.' column (3rd line down) delete "54.7" and insert --94.7--
    Column 13 line 13 (Table VII) after the heading 'Enzyme Dosage' delete "u/g d.s.";
          line 14 (Table VII) above 'Pullulanase' delete "(%d.b.)" and insert --%d.b.-- centered under the column heading 'Starch Solubilized';

UNITED STATES PATENT AND TRADEMARK OFFICE
CERTIFICATE OF CORRECTION

PATENT NO. : 4,113,509

DATED : Sept. 12, 1978

INVENTOR(S) : Harry Woods Leach et al

It is certified that error appears in the above-identified patent and that said Letters Patent are hereby corrected as shown below:

Column 13 line 15 (Table VII) after 'Pullulanase' delete "%d.b.";
         line 15 (Table VII) delete "HP-2" and insert --DP-2--;
         line 16 (Table VII) under 'Alpha-Amylase' and 'Pullulanase' insert --u/g d.s.--;
         line 16 (Table VII) under 'Malt' insert --%d.b.--;
         line 18 (Table VII) or the 2nd line of numbers, shift the numbers to the right one column such that '5' corresponds with the Alpha-Amylase heading, '0.5' corresponds with the Malt heading, '1' corresponds with the Pullulanase heading, '61.1' corresponds with the Starch Solubilized heading, '19.7' corresponds with the d.s. heading, '46' corresponds with the D.E. heading, '3' corresponds with the DP-1 heading, '52' corresponds with the DP-2 heading, and '37' corresponds with the DP-3 heading.

Column 14 line 9, delete "Table VII" and insert --Table VIII--;
         lines 36-38 (Table VIII), shift '24, 48, 24' to the right to line up under the heading Digestion Time Hrs.;
         line 41 (Table VIII) under the DP-2 heading, delete "69" and insert --60--;
         line 46 (under the DP-1 heading) delete "3" and insert --2--;

UNITED STATES PATENT AND TRADEMARK OFFICE
CERTIFICATE OF CORRECTION

PATENT NO. : 4,113,509
DATED : Sept. 12, 1978
INVENTOR(S) : Harry Woods Leach et al It is certified that error appears in the above-identified patent and that said Letters Patent are hereby corrected as shown below:

Column 14 line 68, delete "Table VIII" and insert --Table IX--
Column 15 line 17, delete "maltose-maltotrose" and insert --maltose-maltotriose--;
          line 26, delete "Table IX" and insert --Table X--;
          line 30 (Table X) delete "% d.b." above % d.s. and insert --%d.b.-- shifted to the right to center under the heading Filtrate Composition;
          line 32-34 (Table X), shift '69.6, 61.1' to the left to line up under the heading Starch Solubilized;
          line 35 (Table X) under the DP-2 column of the table, delete "43" and insert --45--;
          line 38 (first line of footnote b) delete "PM" and insert --Ph--;
          line 38 (first line of footnote b) after 'hrs' delete "b" and insert --5--;
          line 50, delete "w/g.d.s." and insert --u/g d.s.--;
          line 57, delete "Table X" and insert --Table XI--;
          line 61 (Table XI), delete "Solubil-" and insert --Solubil--- to the right to line up over 'ization';
          line 67, insert --1-- before 'u/g.d.s.'

UNITED STATES PATENT AND TRADEMARK OFFICE
CERTIFICATE OF CORRECTION

PATENT NO. : 4,113,509

DATED : Sept. 12, 1978

INVENTOR(S) : Harry Woods Leach et al

It is certified that error appears in the above-identified patent and that said Letters Patent are hereby corrected as shown below:

Column 16 line 22, delete "w/g.d.s. and insert --u/g d.s.--;
line 26, delete "Table XI" and insert --Table XII--;
line 55, delete "cam" and insert --can--;
line 65, after '40°' insert --C--

Column 17 line 33, delete "isomarase" and insert --isomerase--

Column 18 line 1, delete "economics" and insert --economies--;
line 4, delete "maltose-maltotiose" and insert --maltose-maltotriose--;
line 29, after 'invention' insert --What is claimed is:--

Signed and Sealed this

Tenth Day of April 1979

[SEAL]

Attest:

RUTH C. MASON
Attesting Officer

DONALD W. BANNER
Commissioner of Patents and Trademarks